US012743420B2

(12) United States Patent
Zhang et al.

(10) Patent No.: US 12,743,420 B2
(45) Date of Patent: Sep. 22, 2026

(54) ACCESSING LARGE OBJECTS

(71) Applicant: INTERNATIONAL BUSINESS MACHINES CORPORATION, Armonk, NY (US)

(72) Inventors: Hong Mei Zhang, Beijing (CN); Shu Hua Liu, Beijing (CN); Sheng Yan Sun, Beijing (CN); Fang Chen, Beijing (CN); Xiao Hui Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 143 days.

(21) Appl. No.: 18/543,033

(22) Filed: Dec. 18, 2023

(65) Prior Publication Data

US 2025/0200037 A1 Jun. 19, 2025

(51) Int. Cl.
*G06F 16/2453* (2019.01)
*G06F 16/22* (2019.01)

(52) U.S. Cl.
CPC .... *G06F 16/24539* (2019.01); *G06F 16/2219* (2019.01)

(58) Field of Classification Search
CPC ....................... G06F 16/2219; G06F 16/24539
See application file for complete search history.

(56) References Cited

U.S. PATENT DOCUMENTS

| | | | | |
|---|---|---|---|---|
| 6,065,013 | A * | 5/2000 | Fuh | G06F 16/289 |
| 6,915,307 | B1 * | 7/2005 | Mattis | G06F 16/10 717/121 |
| 11,720,563 | B1 * | 8/2023 | Khan | H04L 67/568 707/718 |
| 2005/0050074 | A1 * | 3/2005 | Jain | G06F 16/23 |

(Continued)

FOREIGN PATENT DOCUMENTS

| | | |
|---|---|---|
| CA | 2419982 A1 | 8/2004 |
| CN | 2419982 Y | 2/2001 |

(Continued)

OTHER PUBLICATIONS

"A Method to Improve the LOB/XML I/O Performance" Authors Disclosed Anonymously. Sep. 29, 2019. 4 pages.

(Continued)

*Primary Examiner* — Sherief Badawi
*Assistant Examiner* — J Mitchell Curran
(74) *Attorney, Agent, or Firm* — Eric Chesley, Esq.; Rachel L. Pearlman, Esq.; Heslin Rothenberg Farley & Mesiti P.C.

(57) ABSTRACT

Computer implemented methods, systems, and computer program products include program code executing on a processor(s) identifies in a query from a requestor, a predicate(s) comprising a partial access of large object (LOB) data from a LOB. The processor(s) caches a location of the partial access of the LOB data in a buffer, labeling the location with predicates. The processor(s) determines, based on comparing a pre-set access count to a count of accesses for the location that the location is a frequently accessed location and stabilizes the location in an index. The processor(s) determines that the location meets a length threshold and a frequency threshold and saves the LOB data requested in the partial access of the LOB data inline with a base row.

20 Claims, 8 Drawing Sheets

(56) References Cited

U.S. PATENT DOCUMENTS

2014/0280249 A1* 9/2014 Marwah .............. G06F 16/2219
707/754
2016/0132558 A1* 5/2016 Konik ................. G06F 16/2453
707/717
2017/0322960 A1* 11/2017 Glebe ................... G06F 3/0674
2019/0102450 A1 4/2019 Liu et al.
2024/0126746 A1* 4/2024 Bose ................... G06F 16/2379

FOREIGN PATENT DOCUMENTS

CN 111694847 A 9/2020
CN 113645217 B * 5/2023 ............. H04L 63/10

OTHER PUBLICATIONS

"A Method to do Fixed-Length Partial Update of Data in Database" Authors Disclosed Anonymously. Jul. 27, 2020. 4 pages.

Knut Anders Hatlen, "Partial update of JSON values", https://dev.mysql.com/blog-archive/partial-update-of-json-values/, Apr. 3, 2018, 4 pages.

* cited by examiner

ACCESSING LARGE OBJECTS

BACKGROUND

The present invention relates generally to the field of query optimization in databases and, specifically, to improving large object access performance.

Large Objects (LOBs) are a collection of datatypes that are designed to hold a large amount of data and include large images, text files or video files. Generally, a LOB can hold up to maximum size ranging from 8 terabytes to 128 terabytes, depending upon how the database in which the object is populated is configured. Admins, users, and applications store data in LOBs to enable manipulation and access of data in the LOBs. LOBs are suitable for structure (e.g., JSON, XML), semi-structured (e.g., a book, a paper, a resume), and unstructured data. The LOB datatype supports random piece-wise access to data while other datatypes may not. In some databases, a table can include multiple LOBs. Semi structured data has logical structure that is not typically interpreted by a database (e.g., an Extensible Markup Language (XML) document that is processed by any application or any external services). Unstructured data are not typically interpreted by the database or an application and are not broken down into smaller logical structures (e.g., a photographic image stored as a binary file). LOBs enable storage of data in a database and in operating system files (e.g., table workspace) accessed from the database. Advantages of utilizing LOBs to store data include: 1) providing support to content-rich applications; 2) storing both unstructured and semi structured data in efficient manner; 3) optimizing storage of a large amount of data; and/or 4) providing uniform ways for accessing data stored outside a database or within a database.

There are some drawbacks to LOBs which can adversely affect the performance of a database and the computing system in which the database is a component. Notably, involving LOB columns in a sort can consume file storage and decrease sort performance. When a LOB column is referenced multiple times in a query, retrieving data from LOB table (work)space in response to the query, each time the query references the large object column, when evaluating the large object column, will decrease the query performance.

Some applications make extensive use of large objects (LOBs). In many cases, these LOBs are not very large-at most, a few kilobytes in size. The performance of LOB data access can be improved by placing such LOB data within the formatted rows on data pages instead of in a LOB storage object. This configuration of LOBs is referred to as inline LOBs. Inline LOBs can help alleviate bottlenecks for applications because inline LOBs can improve the performance of queries that access LOB data, because no additional I/O is required to fetch, insert, or update this data. Moreover, inline LOB data is eligible for row compression.

Artificial intelligence (AI) refers to intelligence exhibited by machines. Artificial intelligence (AI) research includes search and mathematical optimization, neural networks, and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided through the provision of a computer-implemented method for accessing large objects (LOBs) in a database system. The method can include: identifying, by one or more processors, in a query from a requestor, one or more predicates comprising a partial access of large object (LOB) data from a LOB; caching, by the one or more processors, a location of the partial access of the LOB data in a buffer pool, wherein the caching comprises labeling the location with at least one predicate of the one or more predicates; determining, by the one or more processors, based on comparing a pre-set access count to a count of accesses for the location that the location is a frequently accessed location; based on the determining, stabilizing, by the one or more processors, the location in an index in the buffer pool; determining, by the one or more processors, that the location meets a length threshold and a frequency threshold; and based on determining that the location meets the length threshold and the frequency threshold, saving the LOB data requested in the partial access of the LOB data, inline with a base row.

Shortcomings of the prior art are overcome, and additional advantages are provided through the provision of a computer program product for accessing large objects (LOBs) in a database system. The computer program product comprises a storage medium readable by a one or more processors and storing instructions for execution by the one or more processors for performing a method. The method includes, for instance: identifying, by the one or more processors, in a query from a requestor, one or more predicates comprising a partial access of large object (LOB) data from a LOB; caching, by the one or more processors, a location of the partial access of the LOB data in a buffer pool, wherein the caching comprises labeling the location with at least one predicate of the one or more predicates; determining, by the one or more processors, based on comparing a pre-set access count to a count of accesses for the location that the location is a frequently accessed location; based on the determining, stabilizing, by the one or more processors, the location in an index in the buffer pool; determining, by the one or more processors, that the location meets a length threshold and a frequency threshold; and based on determining that the location meets the length threshold and the frequency threshold, saving the LOB data requested in the partial access of the LOB data, inline with a base row.

Shortcomings of the prior art are overcome, and additional advantages are provided through the provision of a system for accessing large objects (LOBs) in a database system. The system includes: a memory, one or more processors in communication with the memory, and program instructions executable by the one or more processors via the memory to perform a method. The method includes, for instance: identifying, by the one or more processors, in a query from a requestor, one or more predicates comprising a partial access of large object (LOB) data from a LOB; caching, by the one or more processors, a location of the partial access of the LOB data in a buffer pool, wherein the caching comprises labeling the location with at least one predicate of the one or more predicates; determining, by the one or more processors, based on comparing a pre-set access count to a count of accesses for the location that the location is a frequently accessed location; based on the determining, stabilizing, by the one or more processors, the location in an index in the buffer pool; determining, by the one or more processors, that the location meets a length threshold and a frequency threshold; and based on determining that the location meets the length threshold and the frequency threshold, saving the LOB data requested in the partial access of the LOB data, inline with a base row.

Computer systems and computer program products relating to one or more aspects arm also described and may be claimed herein. Further, services relating to one or more aspects are also described and may be claimed herein.

Additional aspects of the present disclosure are directed to systems and computer program products configured to perform the methods described above. Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
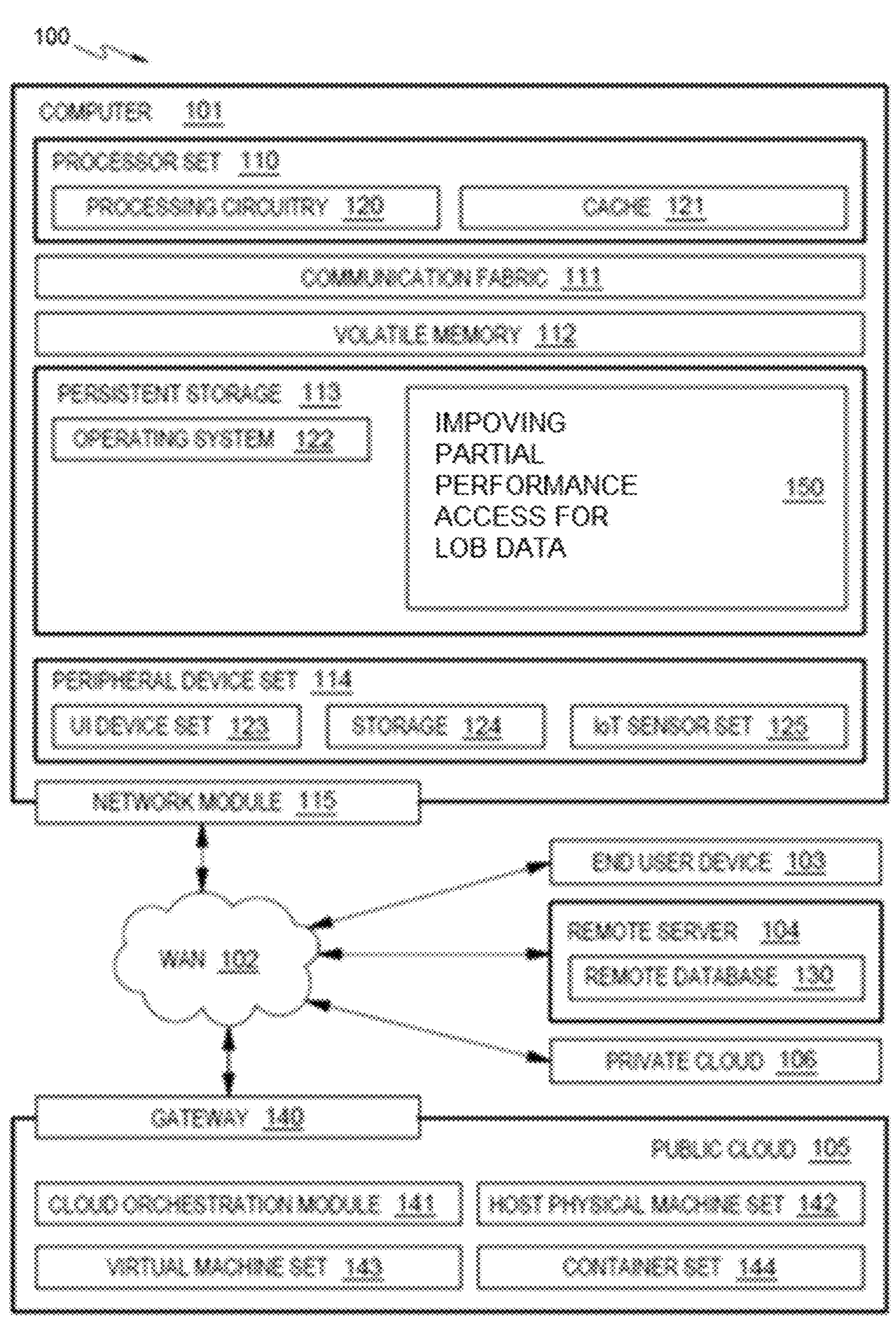
FIG. 1 depicts one example of a computing environment to perform, include and/or use one or more aspects of the present disclosure.

The examples herein include computer-implemented methods, computer program products, and computer systems where program code executing on one or more processors improves query efficiency (and hence, system performance) when accessing LOBs in a database system. Specifically, the examples herein improve access performance of database with LOBs by improving partial access performance for LOBs. Thus, when program code executing a portion of a workload or a workload (e.g., one or more query) accesses data that comprises a portion of an LOB, the examples herein enable greater efficiency for this type of access. To that end, in the examples herein, program code executing on one or more processors utilizes LOB data access history to dynamically cache accessed parts of LOBs to stabilize these portions of LOBs based on this frequent access. The program code also enables the creation of a partial inline LOB. Thus, the program code populates a frequently accessed portion of an LOB (and not, for example, the LOB as a whole) within a formatted row on one or more data pages instead of in the LOB storage object. In some examples, the program code populates the partial inline LOB in a base row of a given data page for ease of access. In certain of the examples herein, program code executing on one or more processors: 1) caches LOB locations: 2) stabilizes these locations; 3) moves frequently accessed portions of an LOB to a (partial) inline LOB; and 4) matches an LOB location to predicates in queries accessing LOB data.

Embodiments of the present invention are inextricably tied to computing. The examples herein provide a computer-based solution to an issue in computing. Many applications and products rely on executing queries in databases. How these queries pull data from various databases within computing systems, such as distributed systems, can be managed by middleware, including database management software. As computing systems grow and enterprise, hybrid, and cloud or other distributed computing environments become more prevalent, inefficient queries can stress the system as a whole and can compromise the performance of the system. As discussed above, LOBs enable storage of data in a database and in operating system files accessed from the database. However, utilizing LOBs can introduce performance challenges: 1) involving LOB columns in sort statements can consume work file storage and decrease sort performance; and 2) when LOBs are referenced multiple times in a query, current query execution approaches decrease query performance because they retrieve the LOB table space each time when evaluating a LOB column. The examples herein are inextricably tied to computing because they address this issue, which is a computing issue, using an approach that manages the processing of these queries, which are also inextricably tied to computing. Specifically, the examples herein increase the efficiency of accessed of LOBs, thus positively impacting the functionality of the database system (as a whole).

The examples herein are directed to a practical application and provide significantly more than existing approaches to executing queries that call LOB columns. LOB columns are columns that contain large amounts of data either in Binary Format (BLOBs) or Character Format (CLOBs). Tables with LOB data can be processed like other data types, and LOB data can be edited and browsed like other data. The examples herein are directed to a practical application at least because the examples herein address a particular issue: the advantages of storing data in LOBs can be outweighed in database systems by the negative impacts referencing these LOBs in a query can have on the query performance. The computer-implemented methods, computer program products, and computer systems described herein provide an approach to accessing LOBs in a more efficient manner. As discussed above, based on frequency of access, program code in the examples described herein creates partial inline LOBs to enable more efficient accesses to LOBs when executing queries (e.g., workloads). The examples herein improve query performance and efficiency by identifying portions of LOBs that are accessed frequently and generating partial inline LOBs. Queries can access these partial inline LOBs instead of the LOBs (as a whole), which improves query performance.

The examples herein provide significantly more than existing approaches at least because there are various advantages to implementing aspects of these examples. As aforementioned, implementing aspects of the examples herein can lead to improved database performance when workloads access partial LOBs. In these circumstances, the program code can cache the LOB location and thus can effectively reduce the LOB page I/O and improve the LOB query performance. The program code can also stabilize the location in an LOB index (i.e., storing these locations in index on disk and not only in a buffer pool), meaning that the index is built by the program code in the examples herein upon an LOB structure as well as based in access history information. Because the program code generates inline partial LOBs, based on queries accessing these structures, the examples herein reduce LOB index and/or LOB page accesses, which can improve the performance of partial LOB updates. The examples herein also provide significantly more than existing LOB database performance solutions because the examples herein enable additional flexibility when storing LOBs and when devising an efficient storage strategy for LOBs. In the examples herein, a user can define whether to stabilize the locations in the LOB index. Additionally, a user can define whether to inline data in a part of an LOB the program code in the examples herein determined has a high access frequency.

The examples disclosed herein can improve storage of LOBs in a database system and hence can improve the efficiency of access to data in LOBS, thus improving performance of the database when workloads are processing within the computing system. Generally. LOB data is stored on a disk in a separate LOB table space (e.g., pages) which is the case in databases including but not limited to DB2, Oracle database, and MySQL. Thus, program code executing on one or more processors (e.g., a database manager) accesses LOB data (e.g., when executing a query in a workload), the program code accesses the base row, LOB index, and LOB tablespace of a database. As aforementioned, some LOB data (generally smaller LOBs) can be stored in a based row, and as such, are referred to an inline LOBs; this configuration can be found in databases including but not limited to DB2 and MySQL. When an LOB is stored inline in this manner, the program code stores a given length of LOB data from its beginning in a base row. By storing the (smaller) LOB in this manner, the program code can provide increased data access performance for thus smaller size of LOB. This solution is not practical with larger LOBs because storing an entirety of an LOB inline can significantly increase the base table size, which will affect, the access performance of the base table.

When a query is received by program code executing on one or more processors in a database system (this program code be the databased manager (DBMS)), the program code responds to the requestor by (ultimately) providing results. In the examples herein, program code executing on one or more processors (which can include program code comprising an LOB Manager) accesses LOBs responsive to queries executed in the database system. Described herein is both how program code designates and/or stores all or portions of LOBs to increase the efficiency of accesses, how program code can update either part of an LOB or an entire, and how program code can access LOB data responsive to queries (having stored and designated LOBs in accordance with the examples described here).

Present approaches access a whole of an LOB (whether inline or not) to provide query results that include data stored in the LOB. When a query accesses part of an LOB (partial access), the command is provided without a given position (or location) and thus, the program code executing the query reads the full LOB into memory. As will be discussed in greater detail herein, in some examples, program code generates locations in the inline storage to enable partial accesses. Returning to present approaches, if an LOB is compressed (e.g., by the database manager), to access a portion of the LOB, the program code decompresses the entire LOB. Below is an example of a query that in present methods would access the entirety of a LOB even though only a portion of the LOB holds results for the query.

Select SUBSTRING(Lob1, POSITION("Name:",Lob1), 12)
From LOB_TABLE
Where ID=:hostvar In this example, although the user (e.g., application or resource from which the query originates) calls for 12 bytes of data from a LOB column, to provide these results, the program code (e.g., database processes) reads and decompresses all the LOB pages and then searches the keywords "Name." to get the target value. The examples herein address this issue and improve partial access performance for LOB data.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present disclosure is described with reference to FIG. 1. In one example, a computing environment 100 contains an example of an environment for the execution of at least some of the computer code involved in performing the inventive methods, such as a code block 150 for improving partial access performance for LOB data in a database. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (LI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments. UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation and/or review to an end user, this recommendation would typically be communicated from network module 115 of computer 101 through WAN 102 to EUD 103. In this way, EUD 103 can display, or otherwise present, the recommendation and/or review to an end user. In some embodiments. EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation and/or review based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
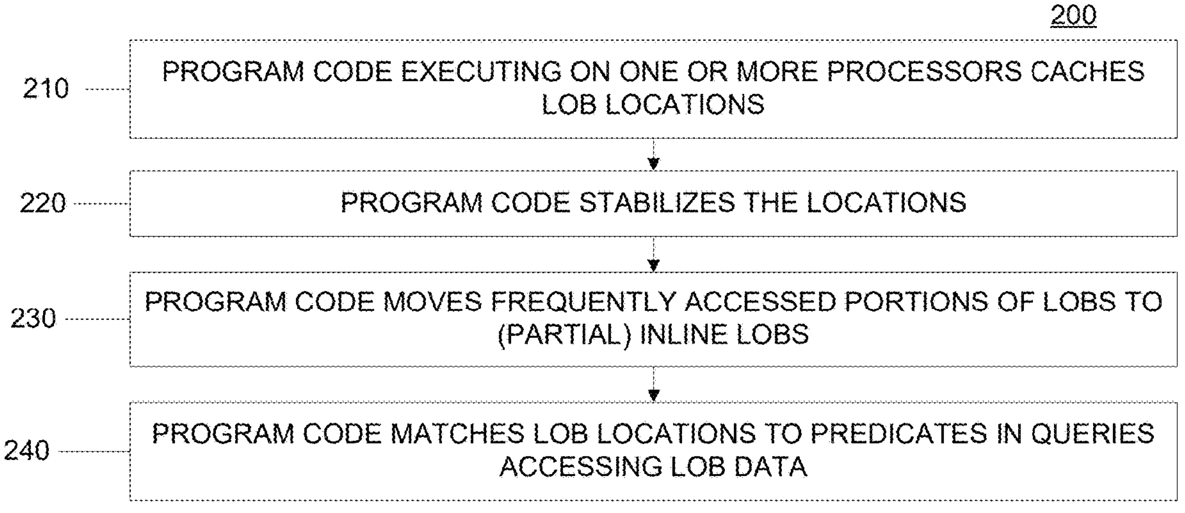
FIG. 2 is a workflow of various aspects performed by the program code (executing on one or more processors) in some embodiments of the present disclosure.
Figure 3:
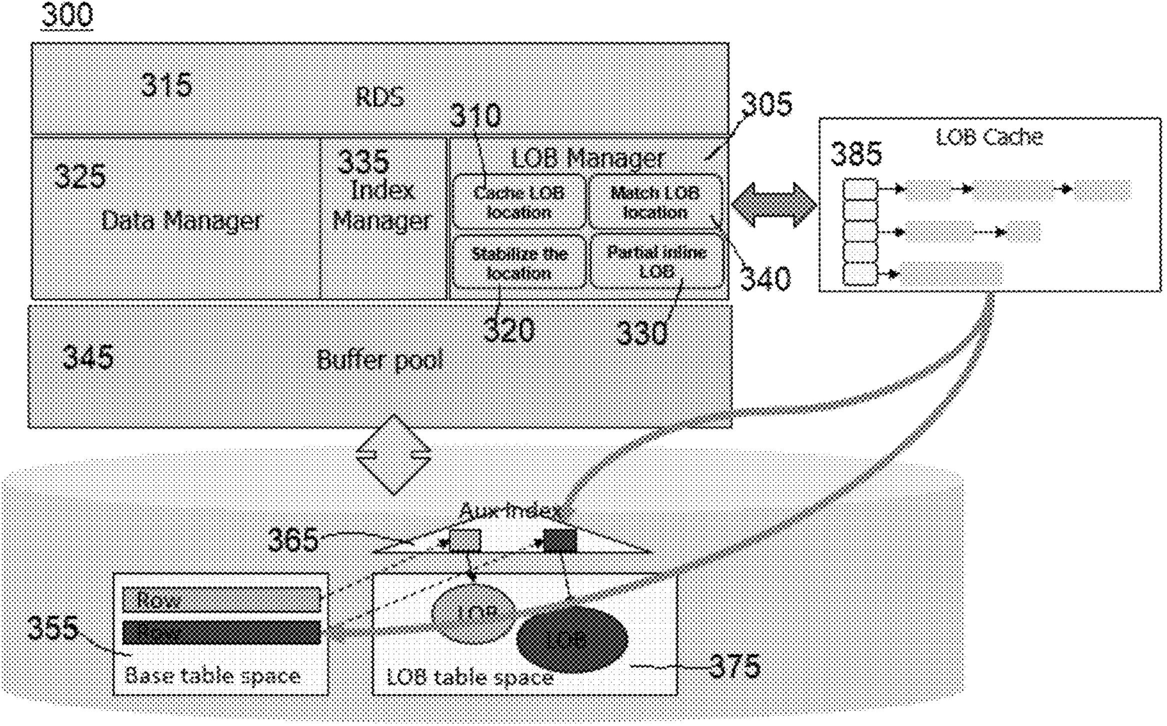
FIG. 3 illustrates a technical environment and a portion of a workflow implemented within the technical environment that comprise various aspects of the examples herein.

FIGS. 2 and 3 provide two different types of overviews of various aspects of the examples herein. FIG. 2 focusses on a workflow while FIG. 3 integrates this workflow into a technical environment. Specifically. FIG. 2 is a workflow 200 that provides are overview of various aspects of some examples herein and describes aspects for improving partial LOB accesses by workloads in a database system. As illustrated in FIG. 2, in some examples herein, program code executing on one or more processors caches LOB locations (210), stabilizes these locations (e.g., in an index, by storing these locations in the index and not only in a buffer pool) (220), moves frequently accessed portions of an LOB to a (partial) inline LOB (230), and matches an LOB location to predicates in queries accessing LOB data (240). These aspects will be described in greater detail herein. FIG. 3 illustrates various aspects of a technical environment into which various aspects described herein can be implemented. For example, the workflow 200 of FIG. 2 is illustrated in FIG. 3 as being implemented by program code executing on one or more processors, which in this example, is referred to as an LOB Manager 305. Generally, program code referred to as a LOB Manager is program code, executing on one or more processors, which provide an interface to LOBs in a database. Program code comprising a LOB Manager, for example, can create references LOBs and store these reference as a row in a database even when the object itself resides outside of a database (or the LOB table space 375). For example, an LOB can reside on a file system (or it could be a binary large object (BLOB) or character large object (CLOB) type column in the database). Program code referred to as an LOB Manager can be understood as a consistent interface to LOBs in a computing system.

As illustrated in FIG. 3, the LOB Manager 305 caches LOB locations (310), stabilizes these locations (320), moves frequently accessed portions of an LOB to a (partial) inline LOB (330), and matches an LOB location to predicates in queries accessing LOB data (340). The LOB manager 305 operates in a relational database (RDS) 315 that also includes program code comprising a data manager 325 and program code comprising an index manager 335. The relational database 315 also includes a buffer pool 345. The buffer pool 345 is an area of main memory that the database manager 325 allocated to the relational database 315 for the purpose of caching table and index data as it is read from disk. The buffer pool 345 includes an auxiliary index 365, which can include a base table space 355, and an LOB table space 375. The operation of the LOB cache 385 is described in the context of the examples herein below.

As illustrated in FIG. 2, program code in examples herein (which can be understood as an LOB manager) identifies and caches partial access LOB locations (210). Thus, when a (e.g., SQL) query with one or more LOB predicates is partially accessing LOB data, the program code labels the data location for the predicate(s), and caches them in memory. A predicate is an element of a search condition that expresses or implies a comparison operation. Predicates can be grouped into four categories that are determined by how and when the predicate is used in the evaluation process: range delimiting predicates (e.g., used to bracket an index scan), index search arguments (e.g., evaluated from the index if one is chosen, because the columns involved in the predicate are part of the index key), data sargable (i.e., Database Management Services (DBMS) engine can take advantage of an index to speed up execution of the query) predicates (e.g., predicates that cannot be evaluated by the index manager, but can be evaluated by DBMS, and residual predicates (e.g., utilize I/O beyond the simple accessing of a base table such as quantified subqueries (subqueries with ANY, ALL, SOME, or IN), or in accessing LOBs, data that is stored separately from the table).

Figure 4:
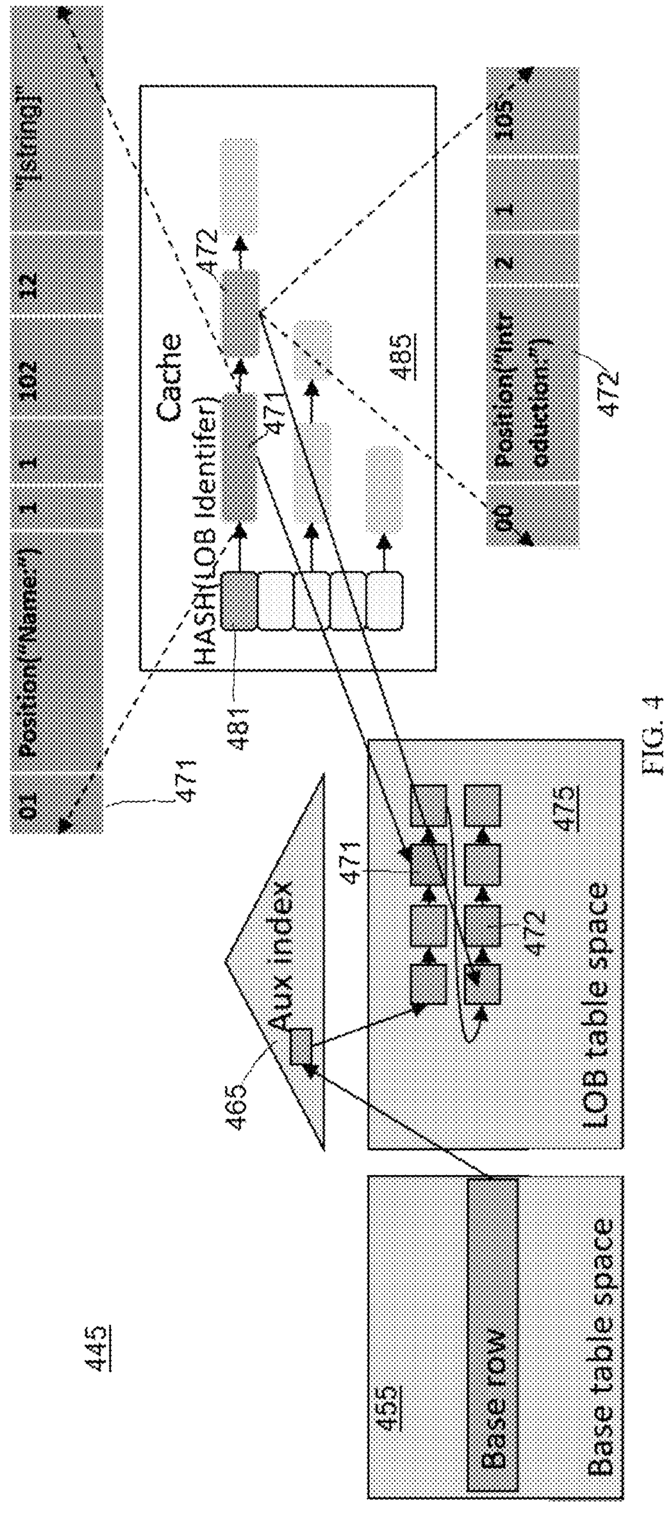
FIG. 4 illustrates the operation of an LOB cache and its interaction with other elements in a buffer pool in accordance with various of the aspects of the present disclosure.

The operation of the LOB cache 385 and its interaction with other elements in the buffer pool 345 are illustrated in FIG. 4. To cache partial access LOB locations (210, 310), the program code identifies a query (e.g., SQL) where one or more LOB predicate is a partial access of LOB data, labels the data location with the at least one predicate, and caches the locations in memory (e.g., buffer pool 345). In some examples, the program code generates a hash based on an LOB identifier (e.g., one LOB for one hash entry and different predicates on the same LOB, chained together). The program code determines if the length of requested data (data requested by the query that accesses part of an LOB) is smaller than a given (e.g., pre-determined, threshold. The program code caches the data with the location. Depending on the implementation, a user can set this threshold and/or the LOB Manager 305 can set the threshold dynamically based on the cache size used for the LOB. A storage format for the entry that can be utilized is reproduced below in Table 1.

TABLE 1

| Flag | Predicate(s) | Access Count | LOB Version | Page Number | LEN (length of string) | LOB Data |
|---|---|---|---|---|---|---|

FIG. 4 illustrates portions of the buffer pool 445 the program code utilizes to cache partial access LOB locations (210, 310). Below are examples of three queries where LOB data is accessed.

Query 1: Select SUBSTRING(Lob1, POSITION("Name: ",Lob1),20)

From LOB_TABLE Where ID=12;

Query 2: Select SUBSTRING(Lob1, POSITION("Introduction:",Lob1), 2000)

From LOB_TABLE Where ID=12;

Query 3: Select SUBSTRING(Lob1, POSITION("Introduction:",Lob1), 5000)

From LOB_TABLE Where ID=12:

The three queries are similar except that the program code is selecting 20, 2000, or 5000 from the LOB table space 375, 475 where an identifier is 12. The first query accesses a first position 471 in the LOB table space 475, which the program code can cache this location the identifier 481 (hash) generated by the program code of the LOB Manager 305. The program code also determines that one or more of the SQL queries accesses a second location 472 and the program code can cache this location with the identifier 481 (hash) generated by the program code of the LOB Manager 305. The program code caches these locations 471, 472 in the LOB cache 485.

Figure 5:
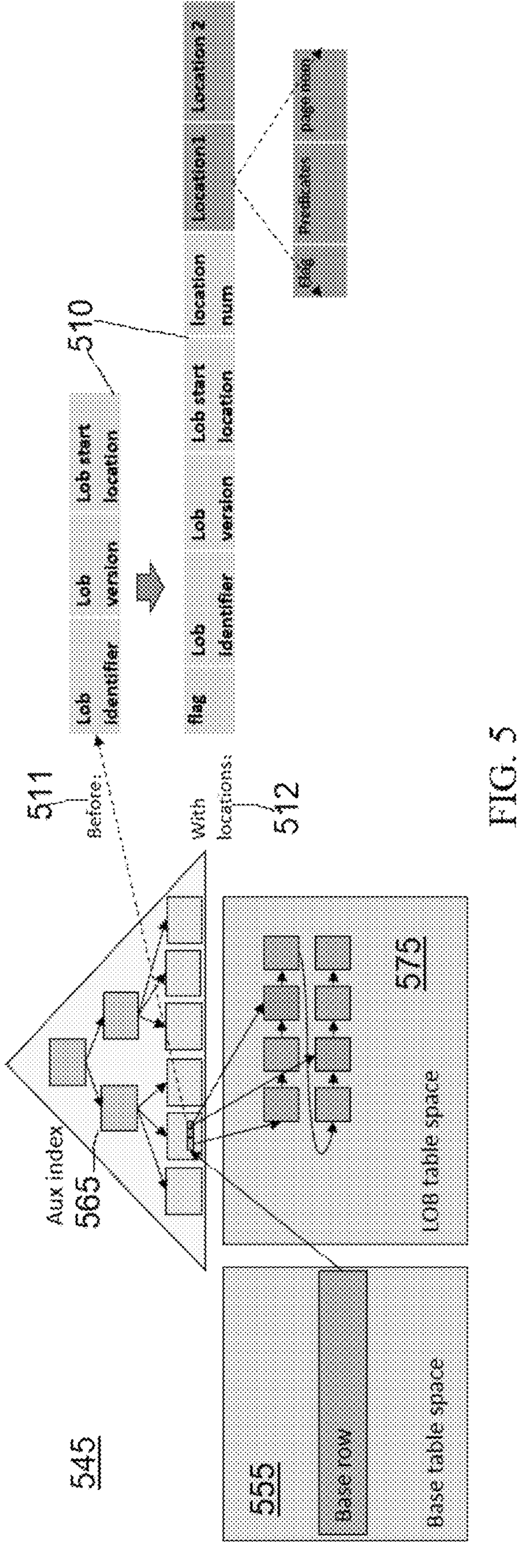
FIG. 5 illustrates aspects of the buffer pool in which the program code in the present disclosure stabilizes locations and provides an example of the program code stabilizing the location in the buffer pool as described in the present disclosure.

As noted above, in some examples, the program code stabilizes the locations) (220, 320, 520). FIG. 5 illustrates aspects of the buffer pool 545 in which the program code stabilizes these locations (e.g., in an auxiliary index 565) and provides an example of the program code stabilizing the location (510) in the buffer pool 545. The program code, in some examples herein, store's locations with high access frequency in LOB index leaf pages in an LOB key when rebuilding an LOB index. Program code comprising the LOB Manager 305 can stabilize the high frequency (frequently accessed) locations in the LOB index when the LOB Manager 305 rebuilds the index (e.g., the auxiliary index 565). Rebuilding the auxiliary index 565 can include rebuilding the LOB table space 575 and the base table space 555. A location can be considered frequently accessed or high frequency by the program code based on the program code determining that accesses to that location have exceeded a threshold count and/or a threshold count is achieved during a set time period. A user (e.g., administrator, program, etc.) can configure both the count and/or the time period. To stabilize the locations, the program code appends the location entries with a key in an LOB index leaf page.

FIG. 5 illustrates the program code stabilizing locations (e.g., location 1, location 2) (520). Before the locations were stabilized by the program code (511), the fields the program code stored in the cache included an LOB identifier, an LOB version, and a stating location for the LOB (the portion of the LOB accessed). After the program code stabilizes the LOB locations (512), the field stored in the cache and includes a flag, the contents of the original cache entry, a location number, and a key in an LOB index leaf page for each location (e.g., location 1 and location 2 although only location 1 is expanded in this example). The leaf index values can include a flag, the predicates, and the page number. Hence, as illustrated in FIG. 5, the program code appends the location entries after the key in LOB index leaf pages. Hence, to stabilize locations, the program code stores these locations in index on a disk (not only in a buffer pool), so that when the cached locations are gone after a database restart, the program code (when executing a portion of a workload) can obtain these locations with high frequency from index disk.

Figure 6:
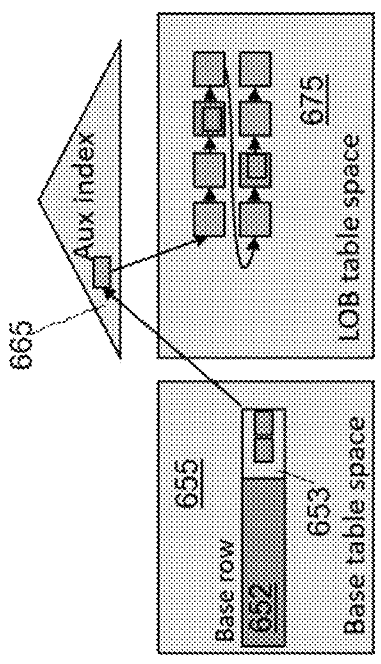
FIG. 6 illustrates program code in some examples moving frequently accessed portions of a LOB to a (partial) inline LOB.
Figure 6:
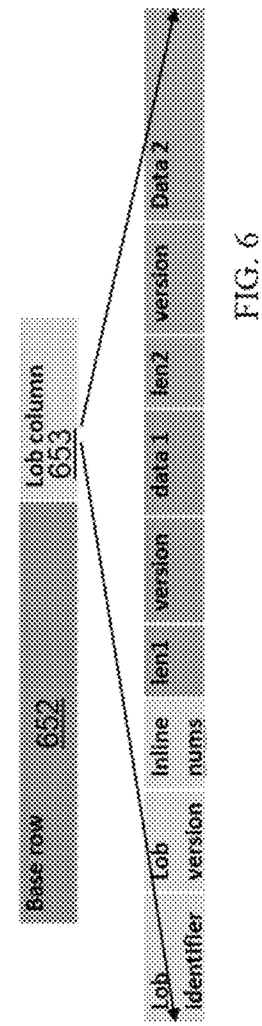

As noted in the workflow 200 of FIG. 2 and in FIG. 3, once the program code has stabilized the LOB locations, program code, in some examples, moves frequently accessed portions of an LOB to a (partial) inline LOB (230, 330). As illustrated in FIG. 6, the program code stabilizes the data parts of an LOB with high access frequency in a base row if the length is under a threshold during reorganization. The program code of the LOB Manager 305 can set a length threshold (e.g., Max_inline_Len) and a frequency threshold (e.g., Min_access) and based on reaching this threshold, the program code can determine which LOB locations (of those identified and cached) with data can be saved inline with a base row 652. The program code can reorganize the table which includes extracting the cached LOB data with LOB identifier and the frequency count. In some examples, the program code stores these data in a base row 652 (of the base table space 655 of the buffer pool 645) if the data length is smaller than Max_inline_Len and the frequency is larger than Min_access. The program code appends LOB data with the corresponding predicates after the LOB identifier in an LOB column 653. The program code can store the full LOB in LOB pages in the LOB table space 675.

Returning to FIGS. 2 and 3, the program code matches an LOB location to predicates in queries accessing LOB data (240, 340). In some examples herein, when program code requests that a LOB manager access a LOB with predicates, the program code (and/or the LOB manager) matches the request with inline LOB portions in a base row. The program code can then search labelled locations in memory and/or match the stabilized locations in the LOB index. If the program code finds a match, the program code can obtain LOB data directly or read the LOB data from the location directly from an LOB page. If the program code does not match the location, the program code reads the full LOB to search for the requested data, using the predicates. The program code can cache the location and if the location from which the program code obtains the data is not cached or the program code can increase (e.g., increment) a frequency count for that location (e.g., when the location was previously cached). This aspect is covered in additional detail in FIG. 8. However, below is an example of a query that the program code can execute to access LOB data.

Select SUBSTRING(Lob1, POSITION("Introduction:", Lob1), 3000)

Figure 7:
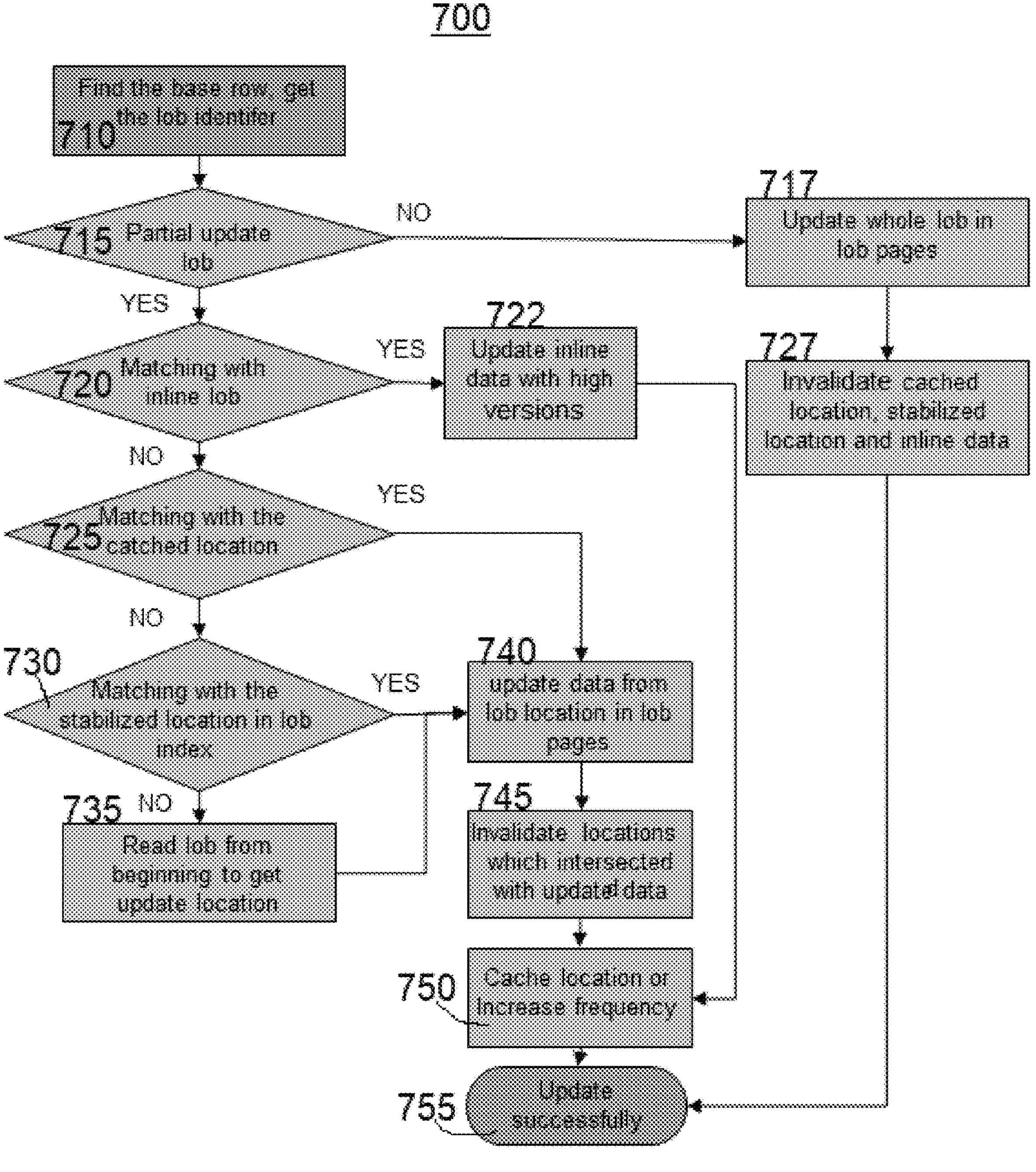
FIG. 7 is a workflow that illustrates program code updating a LOB in accordance with some examples in the present disclosure.
Figure 8:
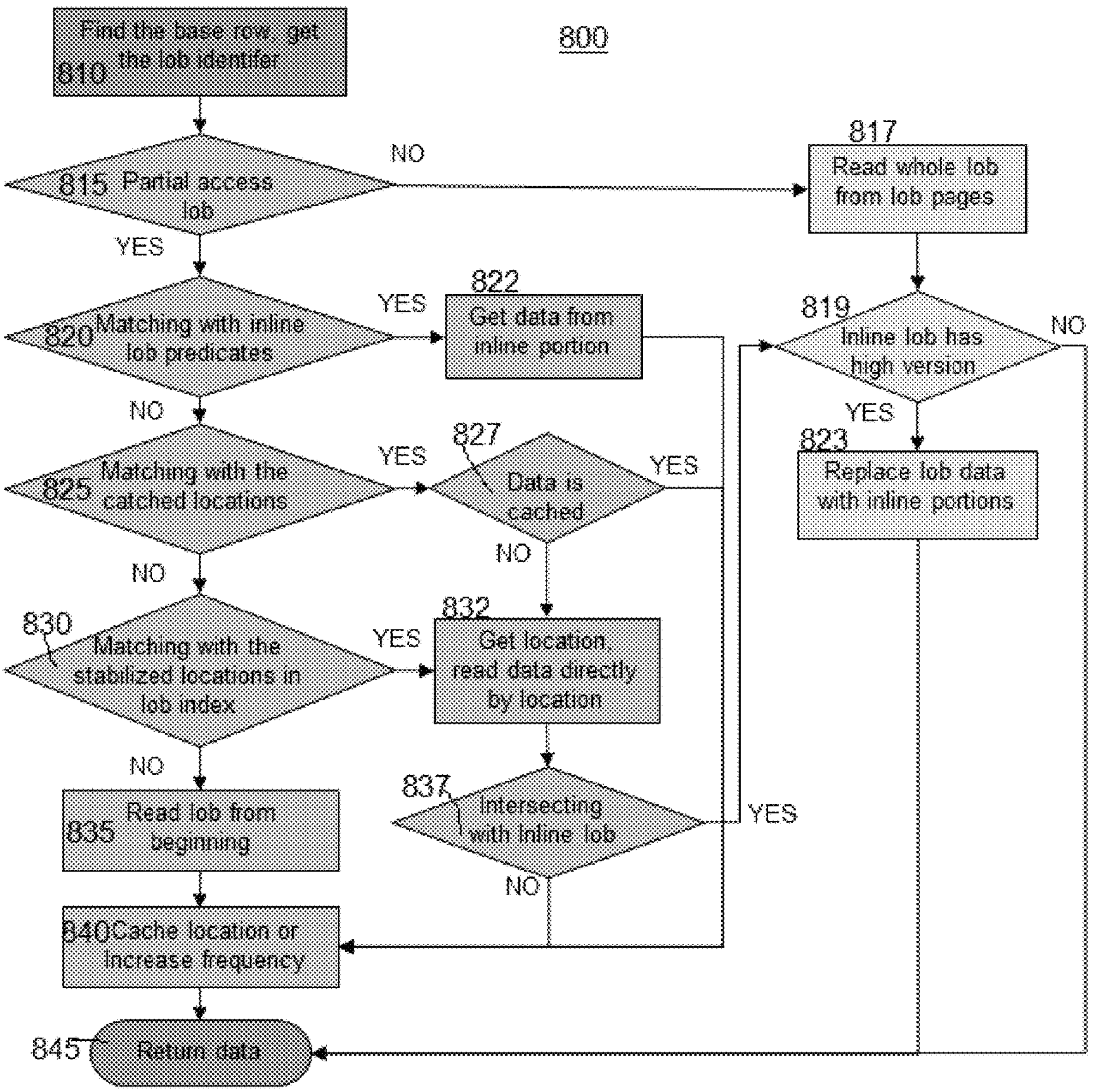
FIG. 8 is a workflow that illustrates program code accessing a LOB in accordance with some examples in the present disclosure.

From LOB_TABLE Where ID=15:

FIGS. 7 and 8 are workflows 700 800 that can be performed by the program code in systems where the aspects described herein were implemented. FIG. 7 is a workflow 7X) that illustrates how program code can update either part of an LOB or an entire LOB. FIG. 8 is a workflow 800 that illustrates how program code can access LOB data in the examples herein.

Referring to FIG. 7, program code executing on one or more processors accesses a base row and finds an LOB identifier (710). The program code determines if the update is to be partial, meaning that the inline LOB data part of the LOB is to be updated (715). Based on determining that this is a partial update, the program code updates the LOB data in a base row and sets a correct version number. The program code does not change the LOB data in the LOB pages and invalidates the cached locations affected by the (partial) update. If the partial update does not include updating the in-line data portion of the LOB, the program code can update LOB data in LOB pages and set a correct version number as well as invalidate the locations which intersected with update data.

As illustrated in FIG. 7, upon determining that the update is a partial data update (715), the program code determines whether the update is to data that is inline or is at a location in the LOB table space. If the data is not inline and located in the LOB table space, the program code locates the location for the update. In the examples herein, the program code (LOB Manager) has cached, and/or stabilized locations in the LOB, and thus, the program code can utilize various shortcuts to obtain the location when the update is not to data that is inline. If these shortcuts do not work, the program code reads the LOB from the beginning to obtain a location for the update (735). Regarding these shortcuts, the program code initially determines if the portion being updated matches an inline LOB (720). If the portion is inline, the program code can update this inline data with high versions (722). If the portion is not inline, the program code then utilizes various inquiries to find the location including determining if the partial update is a match with a cached location (725). If the program determines that no location matches, the program code determines if the data to be updated (in the LOB) matches a stabilized location in the LOB index (730). Having determined that the data to be updated is not inline and attempted to use all the shortcuts to find the location and found no match, the program code reads the LOB from the beginning to obtain a location for the update (735). Thus, with a location obtained either via a cached location, a stabilized location, or based on reading the LOB from the beginning, the program code updates data from the LOB location on LOB pages (740). The program code then invalidates locations that intersect with the updated data (745). The program code (ever if the data were inline) then caches the location and increases the frequency count (for accesses of this portion of the LOB) (750). Upon this update, the program code has updated the partial LOB data (755).

When the program code determines that the update to the LOB data is not a partial update (715) and is instead an update to the whole LOB in the LOB pages, the program code updated the LOB (717). In making this update, the program code invalidates relevant cached locations, stabilized locations, and inline data (727) for the LOB. Thus, the program code has successfully updated the LOB data (750).

FIG. 8 is a workflow 80M that illustrates the program code accessing LOB data (e.g., to execute a query and return results to a requestor) in some examples herein. FIG. 8 illustrates this process both when a whole LOB is read by the program code and when a partial LOB is read by the program code. Responsive to a query, the program code locates a base row for the LOB in the query and obtains an LOB identifier (810). The program code then determines whether the access is to the whole LOB or to part of the LOB (815). When the program code determines that it will access the whole LOB and therefore reads the whole LOB (817), the program code reads the LOB from the LOB pages, first. The program code can then update LOB data with inline portions of LOB data with high versions in order to return data (e.g., results). Thus, the program code determines which portions of the LOB are inline with a high version (819). The program code replaces LOB data with inline portions (823). Thus, to return the data (results) (845), the program code references the inline LOB portions whenever possible, provided the version of the data is compliant (e.g., a high version), to pull data more efficiently from the LOB.

In this workflow 800, when the program code reads a partial LOB (815), the program code initially determines if the LOB (the portion of the LOB) matches with an inline LOB predicate (820). If there is a match, the program code can obtain the data from this inline portion (822) and increase the frequency count (as the location was previously cached for it to be available inline) (840) and return data (results of the query referencing the LOB) (845). When the program code determines that the portion of the LOB data referenced in the query is not inline, the program code then tries to match the portion with locations cached by the program code (825). If the data was cached (827), the program code can obtain the cached data and increase the frequency count (as the location was previously cached for it to be available inline) (840) and return the data (results) of the query (845).

If the program code determines that the location in the LOB of the partial data was not cached, the program code checks whether the location was stabilized in the LOB index by the program code (830). If the location was stabilized, the program code can utilize the reference in the LOB index to obtain the location and read the data directly from the referenced location (832). The program code checks whether the data pulled from the location intersects with any inline LOB data (837) and if there is an intersection (as could be the vase when the whole LOB was referenced in the query), the program code determines which portions of the LOB are inline with a high version (819). The program code replaces LOB data with inline portions (823). Thus, to return the data (results) (845), the program code references the inline LOB portions whenever possible, provided the version of the data is compliant (e.g., a high version), to pull data more efficiently from the LOB. However, if the partial data requested from the LOB does not intersect with the inline LOB, the program code caches the location (as it was not previously cached in this scenario) (840) and then can return data (results) (845).

Although various embodiments are described above, these are only examples. For example, reference architectures of many disciplines may be considered, as well as other knowledge-based types of code repositories, etc., may be considered. Many variations are possible.

Examples herein include computer-implemented methods, computer program products, and computer systems where program code identifies, in a query from a requestor, one or more predicates comprising a partial access of large object (LOB) data from a LOB. The program code caches a location of the partial access of the LOB data in a buffer, wherein the caching comprises labeling the location with at least one predicate of the one or more predicates. The program code determines, based on comparing a pre-set access count to a count of accesses for the location, that the location is a frequently accessed location. Based on determining that, the location is the frequently accessed location, the program code stabilized the location in an index. The program code determines that the location meets a length threshold and a frequency threshold. Based on determining that the location meets the length threshold and the frequency threshold, the program code saves the LOB data requested in the partial access of the LOB data inline with a base row.

In some examples, the program code stabilizes the location in the index when rebuilding the index.

In some examples, the index comprises a LOB index, and the program code stabilizing the location in the LOB index comprises: the program code storing one or more LOB partial locations following an LOB key in one or more LOB index leaf pages.

In some examples, the program code caching the location further comprises: the program code generating, a hash based on an LOB identifier, and the program code determining if a length of the LOB data is smaller than a pre-determined length threshold. Based on determining that the length is smaller than the pre-determined threshold, the program code can cache the location. A record cached in a buffer pool comprises the LOB identifier.

In some examples, the program code saves the LOB data requested in the partial access of the LOB data inline with the base row by appending the LOB data with the at least one predicate with an LOB identifier in an LOB column to generate an inline LOB data part of the LOB.

In some examples, the program code obtains command to perform an update on the LOB data. The program code obtains, from the base row, the LOB identifier of the LOB. The program code determines, based on the command, whether the update is partial data update to the LOB or a full data update to the LOB.

In some examples, when the program code determines that the update is the partial data update, the program code determines if the partial data update is to LOB data comprising the inline LOB data part.

In some examples, when the program code determines that the partial data update is to the LOB data comprising the inline LOB data part, the program code updates the LOB data comprising the inline LOB data part and appending a higher version number to the LOB data comprising the inline LOB data pan. The program code increases the count of accesses for the location.

In some examples, when the program code determines that the partial data update is not to the LOB data comprising the inline LOB data part, the program code determines if the partial data update is a cached location or a stabilized location.

In some examples, when the program code determines that the partial data update is the cached location or the stabilized location, the program code obtains the cached location or the stabilized location. The program code utilizes the cached location or the stabilized location to implement the partial data update in LOB pages. The program code identifies locations in the LOB intersecting with the cached location or intersecting with the stabilized location in the index. The program code invalidates the locations in the LOB intersecting with the cached location or intersecting with the stabilized location. For the stabilized location, the program code caches the stabilized location. For the cached location, the program code increments a count of accesses for the cached location.

In some examples, when the program code determines that the partial data update is not the cached location and not the stabilized location, the program code reads the LOB from the beginning of the LOB to obtain an update location.

The program code utilizes the update location to implement the partial data update in LOB pages. The program code identifies locations in the LOB intersecting with the update location. The program code invalidates the locations in the LOB intersecting with the update location. The program code caches the update location.

In some examples, when the program code determines that the update is the full data update to the LOB, the program code updates the LOB in LOB pages. The program code invalidates cached locations, stabilized locations in the index, and inline data intersecting with the updated LOB.

In some examples, the program code obtains a new query requesting data stored in the LOB. The program code obtains, from the base row, the LOB identifier of the LOB. The program code determines, based on the new query, whether the new query comprises a new partial access to the data stored in the LOB or a full access to the data stored in the LOB.

In some examples, when the program code determines that the new query is the full access to the data stored in the LOB, the program code reads the data stored in the LOB from LOB pages. The program code identifies portions of the data stored in the LOB from the pages with intersecting inline portions of the data stored in the LOB of higher versions than the data stored in the LOB from the LOB pages. The program code replaces the portions of the data stored in the LOB from the LOB pages with the identified intersecting portions. The program code returns the data stored in the LOB from the pages with the replaced portions.

In some examples, when the program code determines that the new query is the new partial access to the data stored in the LOB, the program code determines if a portion of the data stored in the LOB accessed in the new partial access to the data stored in the LOB matches with an inline LOB predicate in the inline LOB data part.

In some examples, when the program code determines that the new partial access to the data stored in the LOB matches with the inline LOB predicate in the inline LOB data part, the program code increments a count of accesses for the inline LOB data part. The program code returns results for the new query from the inline LOB data part.

In some examples, when the program code determines that the new partial access to the data stored in the LOB does not match the inline LOB predicate in the inline LOB data part, the program code determines if the new partial access to the data stored in the LOB matches a cached location. Based on determining the new partial access to the data stored in the LOB matches the cached location, the program code increments a frequency count of the cached location. The program code utilizes the cached location to read a part of the LOB data referenced in the new query from LOB pages. The program code identifies portions of the part of the LOB data referenced in the new query from the pages intersecting inline portions of the LOB data with higher versions than the part of the LOB data referenced in the new query from the LOB pages. The program code replaces the portions of the part of the LOB data from the pages with the identified intersecting portions. The program code returns results comprising the part of the LOB data referenced in the new query, a party of the LOB data referenced in the new query comprising the portions of the part of the LOB data from the pages with the replaced portions.

In some examples, when the program code determines that the new partial access to the data stored in the LOB does not match the inline LOB predicate in the inline LOB data part, the program code determines if the new partial access to the data stored in the LOB matches a cached location. Based on determining the partial new access to the data stored in the LOB does not match the cached location, the program code determines if the partial access to the data stored in the LOB matches a stabilized location in the index. Based on determining, the new partial access to the data stored in the LOB matches the stabilized location, the program code utilizes the stabilized location in the index to read a part of the LOB data referenced in the new query from LOB pages. The program code identifies portions of the part of the LOB data referenced in the new query from the pages intersecting inline portions of the LOB data with higher versions than the part of the LOB data referenced in the new query from the LOB pages. The program code replaces the portions of the part of the LOB data from the pages with the identified intersecting portions. The program code returns results comprising the part of the LOB data referenced in the new query, the part of the LOB data referenced in the new query comprising the portions of the pan of the LOB data from the pages with the replaced portions.

Various aspects and embodiments are described herein. Further, many variations are possible without departing from the spirit of aspects of the present disclosure. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of accessing large objects (LOBs) in a database system, the method comprising:

identifying, by one or more processors, in a query from a requestor, one or more predicates comprising a partial access of large object (LOB) data from a LOB, wherein the partial access of large object (LOB) data from the LOB comprises a portion of a full LOB;

caching, by the one or more processors, a location of the partial access of the LOB data in a buffer, wherein the caching comprises labeling the location with at least one predicate of the one or more predicates;

determining, by the one or more processors, based on comparing a pre-set access count to a count of accesses for the location, that the location is a frequently accessed location;

based on determining that the location is the frequently accessed location, stabilizing, by the one or more processors, the location in an index;

determining, by the one or more processors, that the location meets a length threshold and a frequency threshold;

based on determining that the location meets the length threshold and the frequency threshold, saving, by the one or more processors, the LOB data requested in the partial access of the LOB data inline with a base row, the saving comprising storing the portion of the full LOB inline with the base row; and storing, by the one or more processors, the full LOB in LOB pages in a LOB table space.

2. The computer-implemented method of claim 1, wherein stabilizing the location in the index comprises stabilizing, by the one or more processors, when rebuilding the index.

3. The computer-implemented method of claim 1, wherein the index comprises a LOB index, and wherein stabilizing the location in the LOB index comprises:

storing, by the one or more processors, one or more LOB partial locations following a LOB key in one or more LOB index leaf pages.

4. The computer-implemented method of claim 1, wherein caching the location further comprises:

generating, by the one or more processors, a hash based on a LOB identifier;

determining, by the one or more processors, if a length of the LOB data is smaller than a pre-determined length threshold; and based on determining that the length is smaller than the pre-determined threshold, caching, by the one or more processors, the location, wherein a record cached in a buffer pool comprises the LOB identifier.

5. The computer-implemented method of claim 1, wherein saving the LOB data requested in the partial access of the LOB data inline with the base row comprises:

appending, by the one or more processors, the LOB data with the at least one predicate with a LOB identifier in a LOB column to generate an inline LOB data part of the LOB.

6. The computer-implemented method of claim 5, comprising:

obtaining, by the one or more processors, a command to perform an update on the LOB data;

obtaining, by the one or more processors, from the base row, the LOB identifier of the LOB; and determining, by the one or more processors, based on the command, whether the update is partial data update to the LOB or a full data update to the LOB.

7. The computer-implemented method of claim 6, further comprising:

based on determining that the update is the partial data update, determining, by the one or more processors, if the partial data update is to LOB data comprising the inline LOB data part.

8. The computer-implemented method of claim 7, further comprising:

based on determining that the partial data update is to the LOB data comprising the inline LOB data part, updating, by the one or more processors, the LOB data comprising the inline LOB data part and appending a higher version number to the LOB data comprising the inline LOB data part; and increasing, by the one or more processors, the count of accesses for the location.

9. The computer-implemented method of claim 7, further comprising:

based on determining that the partial data update is not to the LOB data comprising the inline LOB data part, determining, by the one or more processors, if the partial data update is a cached location or a stabilized location.

10. The computer-implemented method of claim 9, further comprising:

based on determining that the partial data update is the cached location or the stabilized location, obtaining, by the one or more processors, the cached location or the stabilized location;

utilizing, by the one or more processors, the cached location or the stabilized location to implement the partial data update in LOB pages;

identifying, by the one or more processors, locations in the LOB intersecting with the cached location or intersecting with the stabilized location in the index;

invalidating, by the one or more processors, the locations in the LOB intersecting with the cached location or intersecting with the stabilized location;

for the stabilized location, caching the stabilized location; and for the cached location, incrementing the count of accesses for the cached location.

11. The computer-implemented method of claim 9, further comprising:

based on determining that the partial data update is not the cached location and not the stabilized location, reading, by the one or more processors, the LOB from a beginning of the LOB to obtain an update location;

utilizing, by the one or more processors, the update location to implement the partial data update in LOB pages;

identifying, by the one or more processors, locations in the LOB intersecting with the update location;

invalidating, by the one or more processors, the locations in the LOB intersecting with the update location; and caching, by the one or more processors, the update location.

12. The computer-implemented method of claim 6, further comprising:

based on determining that the update is the full data update to the LOB, updating, by the one or more processors, the LOB in LOB pages; and invalidating, by the one or more processors, cached locations, stabilized locations in the index, and inline data intersecting with the updated LOB.

13. The computer-implemented method of claim 12, comprising:

obtaining, by the one or more processors, a new query requesting data stored in the LOB;

obtaining, by the one or more processors, from the base row, the LOB identifier of the LOB; and determining, by the one or more processors, based on the new query, whether the new query comprises a new partial access to the data stored in the LOB or a full access to the data stored in the LOB.

14. The computer-implemented method of claim 13, further comprising:

based on determining that the new query is the full access to the data stored in the LOB, reading, by the one or more processors, the data stored in the LOB from LOB pages;

identifying, by the one or more processors, portions of the data stored in the LOB from the pages with intersecting inline portions of the data stored in the LOB of higher versions than the data stored in the LOB from the LOB pages;

replacing, by the one or more processors, the portions of the data stored in the LOB from the LOB pages with the identified intersecting portions; and returning, by the one or more processors, the data stored in the LOB from the pages with the replaced portions.

15. The computer-implemented method of claim 13, further comprising:

based on determining that the new query is the new partial access to the data stored in the LOB, determining, by the one or more processors, if a portion of the data stored in the LOB accessed in the new partial access to the data stored in the LOB matches with an inline LOB predicate in the inline LOB data part.

16. The computer-implemented method of claim 15, further comprising:

based on determining that the new partial access to the data stored in the LOB matches with the inline LOB predicate in the inline LOB data part, incrementing, by the one or more processors, a count of accesses for the inline LOB data part; and returning, by the one or more processors, results for the new query from the inline LOB data part.

17. The computer-implemented method of claim 15, further comprising:

based on determining that the new partial access to the data stored in the LOB does not match the inline LOB predicate in the inline LOB data part, determining, by the one or more processors, if the new partial access to the data stored in the LOB matches a cached location;

based on determining the new partial access to the data stored in the LOB matches the cached location, incrementing, by the one or more processors, a frequency count of the cached location;

utilizing, by the one or more processors, the cached location to read a part of the LOB data referenced in the new query from LOB pages;

identifying, by the one or more processors, portions of the part of the LOB data referenced in the new query from the pages intersecting inline portions of the LOB data with higher versions than the part of the LOB data referenced in the new query from the LOB pages;

replacing, by the one or more processors, the portions of the part of the LOB data from the pages with the identified intersecting portions; and returning, by the one or more processors, results comprising the part of the LOB data referenced in the new query, a part of the LOB data referenced in the new query comprising the portions of the part of the LOB data from the pages with the replaced portions.

18. The computer-implemented method of claim 15, further comprising:

based on determining that the new partial access to the data stored in the LOB does not match the inline LOB predicate in the inline LOB data part, determining, by the one or more processors, if the new partial access to the data stored in the LOB matches a cached location;

based on determining the partial new access to the data stored in the LOB does not match the cached location, determining, by the one or more processors, if the partial access to the data stored in the LOB matches a stabilized location in the index;

based on determining, the new partial access to the data stored in the LOB matches the stabilized location, utilizing, by the one or more processors, the stabilized location in the index to read a part of the LOB data referenced in the new query from LOB pages;

identifying, by the one or more processors, portions of the part of the LOB data referenced in the new query from the pages intersecting inline portions of the LOB data with higher versions than the part of the LOB data referenced in the new query from the LOB pages;

replacing, by the one or more processors, the portions of the part of the LOB data from the pages with the identified intersecting portions; and returning, by the one or more processors, results comprising the part of the LOB data referenced in the new query, the part of the LOB data referenced in the new query comprising the portions of the part of the LOB data from the pages with the replaced portions.

19. A computer system for accessing large objects (LOBs) in a database system, the computer system comprising:

a memory; and one or more processors in communication with the memory, wherein the computer system is configured to perform a method, said method comprising:

identifying, by the one or more processors, in a query from a requestor, one or more predicates comprising a partial access of large object (LOB) data from a LOB, wherein the partial access of large object (LOB) data from the LOB comprises a portion of a full LOB;

caching, by the one or more processors, a location of the partial access of the LOB data in a buffer, wherein the caching comprises labeling the location with at least one predicate of the one or more predicates;

determining, by the one or more processors, based on comparing a pre-set access count to a count of accesses for the location, that the location is a frequently accessed location;

based on determining that the location is the frequently accessed location, stabilizing, by the one or more processors, the location in an index;

determining, by the one or more processors, that the location meets a length threshold and a frequency threshold;

based on determining that the location meets the length threshold and the frequency threshold, saving, by the one or more processors, the LOB data requested in the partial access of the LOB data inline with a base row, the saving comprising storing the portion of the full LOB inline with the base row; and storing, by the one or more processors, the full LOB in LOB pages in a LOB table space.

20. A computer program product for accessing large objects (LOBs) in a database system, the computer program product comprising:

one or more computer readable storage media and program instructions collectively stored on the one or more computer readable storage media readable by at least one processing circuit to:

identify, in a query from a requestor, one or more predicates comprising a partial access of large object (LOB) data from a LOB, wherein the partial access of large object (LOB) data from the LOB comprises a portion of a full LOB;

cache a location of the partial access of the LOB data in a buffer, wherein the caching comprises labeling the location with at least one predicate of the one or more predicates;

determine, based on comparing a pre-set access count to a count of accesses for the location, that the location is a frequently accessed location;

based on determining that the location is the frequently accessed location, stabilize the location in an index;

determine that the location meets a length threshold and a frequency threshold; and based on determining that the location meets the length threshold and the frequency threshold, save the LOB data requested in the partial access of the LOB data inline with a base row, the saving comprising storing the portion of the full LOB inline with the base row; and store the full LOB in LOB pages in a LOB table space.

* * * * *